May 22, 1951

A. FRUM 2,553,572

CROSSTALK REDUCTION IN PULSE MULTIPLEX RECEIVER SYSTEMS

Filed Nov. 10, 1947

INVENTOR.
ALEXANDER FRUM

BY

ATTORNEY

Patented May 22, 1951

2,553,572

UNITED STATES PATENT OFFICE 2,553,572

CROSS TALK REDUCTION IN PULSE MULTIPLEX RECEIVER SYSTEMS

Alexander Frum, Far Rockaway, N. Y., assignor to International Standard Electric Corporation, New York, N. Y., a corporation of Delaware Application November 10, 1947, Serial No. 785,011

8 Claims. (Cl. 179—15)

This invention relates to methods and means for suppressing cross-talk between adjacent channels in multiplex channel pulse modulation communication systems.

In multiplex communication systems the intelligence of the respective channels is conveyed in the form of pulses which are modulated generally in respect to their characteristics of time or amplitude. The pulses of the various channels are provided at given rates of occurrences, one being provided for each repetitive cycle. These cyclical pulses of the various channels are interleaved to form consecutive trains of pulses, the cycle for the various channels forming repetitive groups the extent of which depends upon the number of channels used. In order to effectively utilize the facilities for transmission and reception of such multiplex channel systems fairly close spacing of the channel pulses is usually required with the result that due to distortion or broadening of the individual pulses cross talk difficulties arise since overlapping of a given channel may extend over one or more of the adjacent succeeding channel periods.

It is an object of the present invention to provide a method and means to substantially reduce the effect of overlapping of adjacent channel pulses in multi-channel communication systems of the type referred to.

It is another object of the invention to reduce the cross-talk between adjacent succeeding channel periods in communication systems of the above type by confining the acceptance or passage of the signal conveying pulses to limited periods of time in order to improve the ratio of the energy representing the intelligence and the energy representing cross-talk.

In accordance with certain features of the invention the successive signal pulses, are permitted to pass to the translating channels by means of gating in such a way that gated portions thereof contain substantially equal contributions of the overlap or the transient hangover from respective preceding pulses which are made to cancel each other at least in part by combination thereof in phase opposition.

Figure 1:
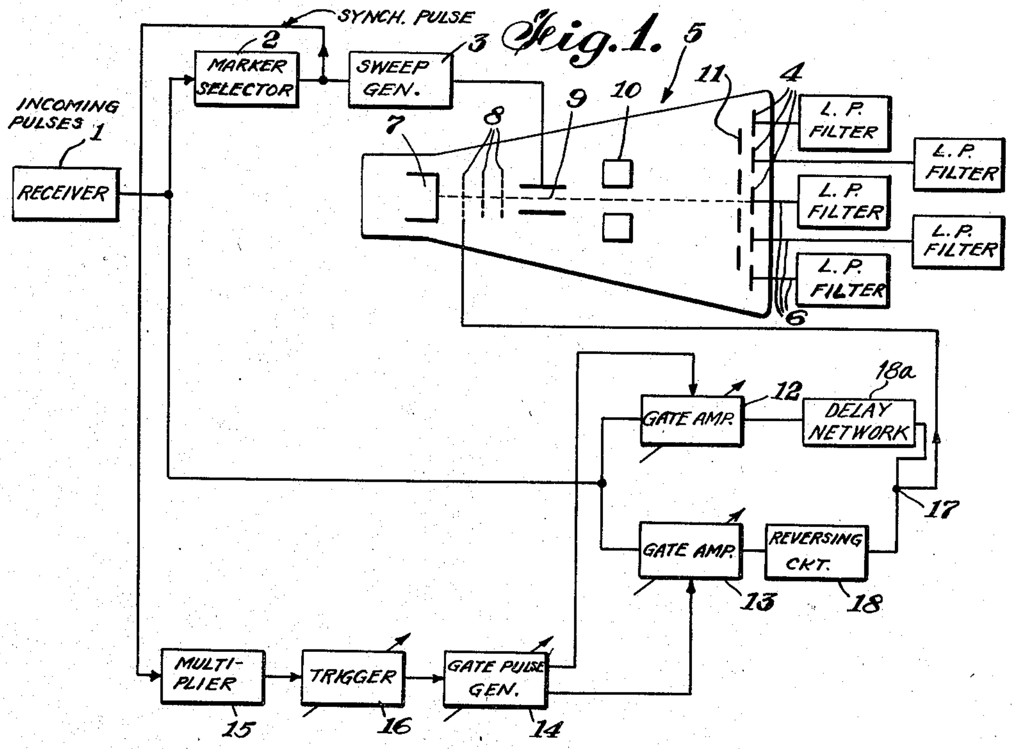
Figure 2:
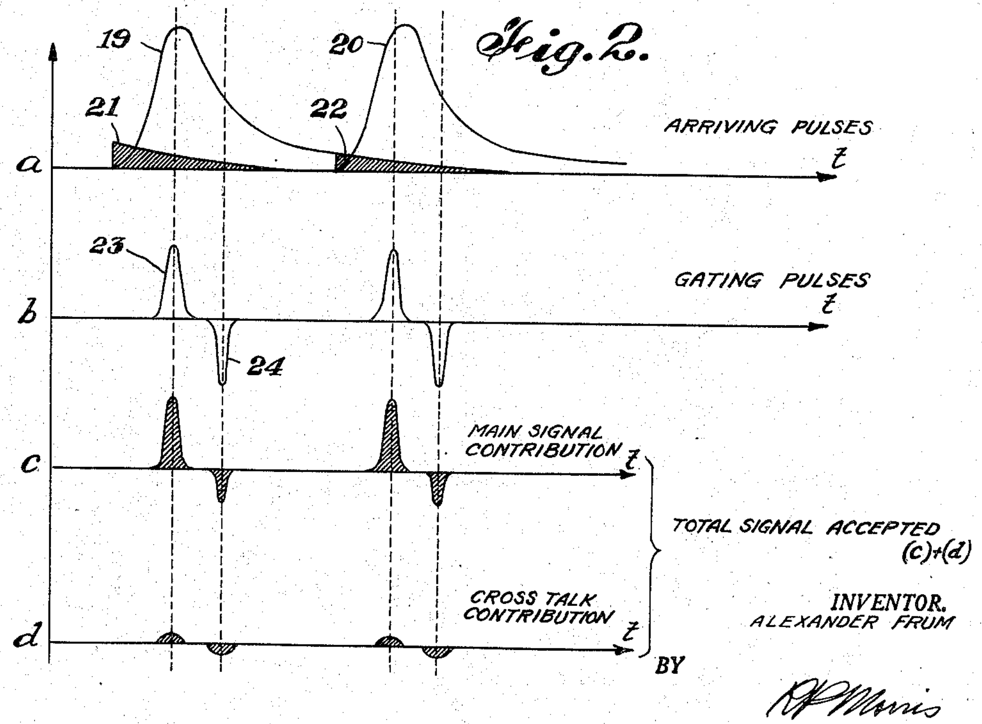

The above mentioned and other features and objects of the invention will become more apparent and the invention itself, though not necessarily defined thereby, will be clearly understood by reference to the following description of the embodiment of the invention taken in connection with the accompanying drawings wherein:

Fig. 1 is a circuit diagram substantially in block form indicating a receiver of a system in accordance with the invention; and Fig. 2 is a series of graphs illustrating certain operative conditions of the system of Fig. 1.

Referring now to the diagram in Fig. 1, the reference 1 shows a receiving circuit wherefrom is obtained a train of pulses representing the various communicating channels of a multiplex pulse modulating system. The train of pulses as is generally the case, includes periodically occurring synchronizing or marker pulses which are selected or isolated in a marker pulse selector circuit 2. These synchronising pulses are utilized for controlling a sweep generator circuit 3 which controls the cyclical deflection of a cathode ray beam across targets 4 in a cathode ray type distributor 5 which acts to periodically connect the respective channels 6 in synchronism with the incoming signal pulses. The cathode ray distributor 5 is of a well known type and includes an electron gun comprising a cathode 7, control grid 8 and deflection plates 9 and 10 respectively. An aperture plate 11 in front of the targets 4 forms a so-called dynode secondary electron emission system in conjunction with these targets as disclosed in the prior art. The train of pulses from the receiver is applied simultaneously to a pair of gated amplifiers indicated at 12 and 13 which are controlled from a gate pulse generator circuit 14 supplying suitable gating pulses. The isolated synchronizing pulse from the marker selector 2 are applied to a pulse multiplier circuit 15 whereby each of the synchronizing pulses is caused to provide a number of pulses occurring substantially in sychronism with the respective channel pulses.

These series of multiplexed pulses are applied to a triggering device 16 which may be differentiator or similar device to provide narrow type, high energy pulses in order to effectively trigger the gate pulse generator 14 which may take the form of a multivibrator for supplying square pulses having positive and negative polarity or phase, respectively. The timing or phase relationship and amplitude of the square pulses obtained from the generator 14 may be adjusted by suitable adjustment means in the triggering circuit 16 and the generator 14 itself respectively. As the successive signal or channel pulses are applied to the gated amplifiers 12 and 13, the gating pulses synchronously applied thereto permit selected portions of these pulses to pass through the amplifiers 12 and 13 which portions are combined at point 17 after one of the portions has been inverted in phase in a suitable reversing circuit 18 and the other portion has been appropriately delayed in delay device 18a. The combined resultant signal is applied as a control voltage to the control grid 8 whereby the cathode ray beam is effective only during the application of such resultant signal portions. Although the gating pulses have been described as being positive and negative, this is merely a convenient way of selecting the pulses for use in the separate gated amplifiers. It will be understood that any characteristic which will permit the segregation may be used.

Referring now to the graphs of Fig. 2 the successive channel pulses are indicated at 19 and 20 each of them shown to have overlapping portions indicated at 21 and 22 from preceding channels. The resulting overlap, that is, the area of a hangover of a preceding pulse coincidental with the signal area of the succeeding pulse is shown in cross-hatch (graph *a*). In graph *b* are shown the type of gating pulses obtained from the generator 14 the positive and negative portions being indicated at 23 and 24 respectively and occurring simultaneously with the main channel pulses. The cross-hatched portions of the gating pulses indicated in graphs *c* and *d* indicate the main signal portions and cross-talk portions of the pulse energy admitted or passed through the gate amplifiers 12 and 13.

As the positive and negative gate-passed portions shown in graph *c* are combined, the portions shown in graph *d* which are due to cross-talk, effectively cancel each other out to a substantial degree, while the remaining signal portion is effective in conveying the intelligence transmitted and becomes substantially free of cross-talk or channel interference.

This method is particularly effective with pulses which are amplitude modulated and where the trailing edges of the transient or overlapping hangovers are not oscillatory. In the form shown the positive peak of the gate pulse is phased such that it admits the maximum portion of the desired pulses, the negative peak being so placed that it passes a section of the desired pulses substantially adjacent to the maximum portions but perhaps 6–10 db down. Assuming that the hangover of the preceding channel is fairly smooth and level, the cross-talk contributions passed by the two gating pulses will be substantially equal and will cancel each other while the main signal will not be weakened to a similar degree. The present invention has been described particularly in combination with a receiving circuit, as certain advantages are obtained thereby. It is however comtemplated not to limit the application to the receiving end but leave the application of the cross-talk suppression system open to practical consideration, the transmitter end being quite suitable at certain times.

While I have described the principles of my invention in connection with specific apparatus, it is to be clearly understood that this description is made only by way of example and not as a limitation on the scope of my invention.

What is claimed is:

1. A circuit for reducing interchannel interference in a multi-channel pulse modulation communication system having channel pulses which form a train of interleaved pulses representing individual channels conveying intelligence, the said pulses having undesired portions overlapping into succeeding pulses and occurring at a predetermined rate of repetition, comprising means for generating a pair of gating pulses synchronously with two parts of each of said channel pulses, the undesired overlapping portion having substantially equal values, while the channel pulse has substantially different values, at said two parts, means for distributing said channel pulses to a plurality of corresponding channels, means operatively controlled by said gating pulses for controlling by gating the application of said channel pulses to said distributing means, and means for combining the two gated parts of each channel pulse at the output of said controlling means in phase opposition, whereby the gate-passed pulse portions of theoverlap are substantially eliminated and a representative portion of the channel pulses is obtained.

2. A circuit according to claim 1, wherein said distributing means comprises a cathode ray electronic distributor.

3. A receiver circuit for reducing interchannel interference in a multi-channel pulse modulation communication system having channel pulses which form a train of interleaved pulses representing individual channels conveying intelligence, the said pulses having undesired portions overlapping into succeeding pulses and occurring at a predetermined rate of repetition, comprising means for receiving the train of channel pulses, means for deriving from said received pulse train a signal representative of the rate of repetition of said pulses, means energized from said deriving means for generating a pair of gating pulses synchronously with two parts of each of said channel pulses, the undesired overlapping portion having substantially equal values, while the channel pulse has substantially different values, at said two parts, a pair of gating amplifiers operatively connected to said receiving means and operatively controlled by said gating pulses respectively, means for additively combining the two gated parts of each channel pulse at the output of said pair of amplifiers in phase opposition, a plurality of communication channels for utilizing said received channel pulses, and a cathode ray electronic distributor intermediate said combining means and said communication channels, the channel pulse portions passed by said gating amplifiers controlling said distributor.

4. A circuit according to claim 3, wherein said deriving means comprises means for selecting synchronizing pulses from said pulse train.

5. A circuit according to claim 3, wherein said combining means includes a pulse phase reversing device associated with one of said amplifiers.

6. A circuit according to claim 3, wherein said deriving means comprises means for selecting synchronizing pulses from said pulse train, and said generating means includes a multiplier energized from said synchronizing pulse selector, a trigger circuit and a gate pulse generator.

7. A circuit according to claim 6, further including adjusting means for said trigger circuit and said gate pulse generator for adjusting the phase and amplitude respectively of said pair of gate pulses.

8. A circuit according to claim 3, wherein said deriving means comprises means for selecting synchronizing pulses from said pulse train, further including a sweep voltage generator for said electronic distributor operatively controlled from said selecting means.

ALEXANDER FRUM.

REFERENCES CITED

The following references are of record in the file of this patent:

UNITED STATES PATENTS

| Number | Name | Date |
|---|---|---|
| 2,236,134 | Gloess | Mar. 25, 1941 |
| 2,265,216 | Wolf | Dec. 4, 1941 |
| 2,310,692 | Hansell | Feb. 9, 1943 |
| 2,311,021 | Blumlein | Feb. 16, 1943 |
| 2,372,876 | Bingley | Apr. 3, 1945 |

FOREIGN PATENTS

| Number | Country | Date |
|---|---|---|
| 605,128 | Great Britain | July 16, 1948 |